United States Patent
Stamper et al.

(10) Patent No.: US 6,521,129 B1
(45) Date of Patent: Feb. 18, 2003

(54) PROCESS FOR PRODUCING ENERGY, FEED MATERIAL AND FERTILIZER PRODUCTS FROM MANURE

(76) Inventors: Ken Stamper, 1818 Saddleback Blvd., Norman, OK (US) 73072; Richard Skinner, 1225 Hampden Rd., Bartlesville, OK (US) 74006

( * ) Notice: Subject to any disclaimer, the term of this patent is extended or adjusted under 35 U.S.C. 154(b) by 0 days.

(21) Appl. No.: 09/938,905

(22) Filed: Aug. 24, 2001

(51) Int. Cl.$^7$ ................................ C02F 3/28; C05F 3/00
(52) U.S. Cl. .................. 210/603; 210/612; 210/631; 71/21; 435/262.5
(58) Field of Search ............... 210/603, 609, 210/612, 613, 631; 435/262, 262.5; 71/21; 48/127.3, 127.5

(56) References Cited

U.S. PATENT DOCUMENTS

| | | | |
|---|---|---|---|
| 4,040,953 A | * 8/1977 | Ort | 210/603 |
| 4,198,292 A | * 4/1980 | Snider et al. | 210/612 |
| 4,372,856 A | * 2/1983 | Morrison | 210/603 |
| 4,710,300 A | * 12/1987 | Kristoufek | 210/603 |
| 4,750,454 A | 6/1988 | Santina et al. | |
| 4,765,900 A | 8/1988 | Schwoyer et al. | |
| 5,096,579 A | 3/1992 | Jordan et al. | |
| 5,411,567 A | * 5/1995 | Ueotani et al. | 71/9 |
| 5,863,434 A | 1/1999 | Massé et al. | |
| 5,958,758 A | 9/1999 | Miller et al. | |
| 6,007,719 A | * 12/1999 | Yoo et al. | 210/603 |
| 6,071,418 A | 6/2000 | Tai | |
| 6,190,566 B1 | 2/2001 | Kolber | |
| 6,245,121 B1 | 6/2001 | Lamy et al. | |
| 6,248,148 B1 | 6/2001 | Faulmann et al. | |
| 6,254,775 B1 | 7/2001 | McElvancy | |
| 6,368,849 B1 | * 4/2002 | Norddahl | 435/262 |
| 6,391,203 B1 | * 5/2002 | Fassbender | 210/603 |
| 2001/0013497 A1 | 8/2001 | Kolber | |

* cited by examiner

*Primary Examiner*—Fred Prince
(74) *Attorney, Agent, or Firm*—Dunlap, Codding & Rogers, P.C.

(57) ABSTRACT

A process for treating manure using anaerobic digestion includes introducing manure into a mixing vessel containing a digester liquid and agitating and filtering a slurry formed therefrom to remove substantially all water insoluble solids, thereby leaving a liquid containing ammonia and reactive organic materials. The liquid is then heated and ammonia is removed therefrom to produce a substantially ammonia-free liquid containing reactive organic materials, which is cooled and placed in a digester containing anaerobic bacteria to convert the reactive organic materials in the liquid to biogas and to produce a digester liquid. The biogas is withdrawn and utilized to generate electricity, and a small amount of the digester liquid is withdrawn from the digester and recycled back to the mixing vessel. The water insoluble solids and ammonia removed during the process may be converted to ruminant animal feed and concentrated liquid fertilizer, respectively.

20 Claims, 1 Drawing Sheet

US 6,521,129 B1

PROCESS FOR PRODUCING ENERGY, FEED MATERIAL AND FERTILIZER PRODUCTS FROM MANURE

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to bioconversion of waste to useful products, and more particularly, but not by way of limitation, to methods of treating manure using anaerobic digestion.

2. Brief Description of the Art

The number and size of concentrated animal feeding operations, including agricultural operations which produce beef, pork, poultry, milk or eggs, have been steadily increasing for the past 50 years. The primary benefit of housing and feeding larger numbers of agricultural animals at a single site is that the consolidated operations give an economy of scale that lowers per unit product operating costs and improves profitability. However, as the number and size of concentrated, confined animal feeding operations has grown over the years, the development of technology to treat the waste material from these facilities has seriously lagged. The majority of the waste material from existing operations is land-applied with little treatment. Typically, manure disposal is a net cost to the animal feeding operation, and there are environmental concerns about direct application of raw manure to the ground, including rainwater runoff of pollutants into surface and ground waters and emissions of greenhouse gases to the atmosphere.

In particular, chicken egg production in the United States has undergone significant change in recent years. Such change is characterized by modest growth of the producing flock, and individual producing sites have become larger. For example, it is estimated that there are currently more than 50 egg production facilities in the United States which contain a minimum of one million laying hens. Producers have been faced with the fact that egg production and processing operations must become large and more concentrated to improve economic performance in a competitive business environment. However, of the known major producing facilities with more than one million layers, none are known to use any type of manure processing technology but rather simply apply the manure to farm ground as a method of disposal, and, as mentioned above, there are economic and environmental concerns with this method of disposing of manure generated by the egg producing operation.

Bioconversion refers to the conversion of organic matter (such as waste material) into useful products (such as usable energy) by bacterial decomposition of such organic matter. Bioconversion is also known as anaerobic digestion, which is a process utilized for pollution control in municipal sewage treatment and livestock waste handling. For example, in some cases, operators of animal feeding operations have constructed lagoons to hold manure and to allow some anaerobic digestion of the waste material before it is applied to the land. However, the condition and operation of some of these lagoons has been the subject of national news headlines, such as the breach of lagoon dikes in North Carolina and Iowa. In addition, while research by universities and government labs has shown that animal manure can be effectively treated with anaerobic digestion, poultry manure has been shown to be the most difficult to treat. Conventional anaerobic digestion technology has certain limitations in terms of reaction rates and the ability of the bacteria to be productive when conditions (such as pH, temperature and concentration of certain chemical constituents) in the digester are not optimum, and current literature teaches that anaerobic treatment of poultry manure can only be accomplished if the manure is diluted with water at a ratio of between 4 to 1 and 10 to 1. While such dilution allows for digestion of the manure, it also increases the volume of waste that must be handled and ultimately sent to disposal. As a result, this approach increases processing costs and is therefore not economic.

In spite of the efforts of the government and the animal feeding industry, there are no cost effective manure treatment facilities in operation that are not a significant and direct financial burden to the producer. Therefore, new and improved methods of treating manure using anaerobic digestion technology that overcome the disadvantages and defects of the prior art are highly desired. It is to such methods of treating manure by anaerobic digestion which not only eliminate the cost of manure disposal but also result in the production of commercially viable products that the present invention is directed.

DETAILED DESCRIPTION OF THE INVENTION

Figure 1:
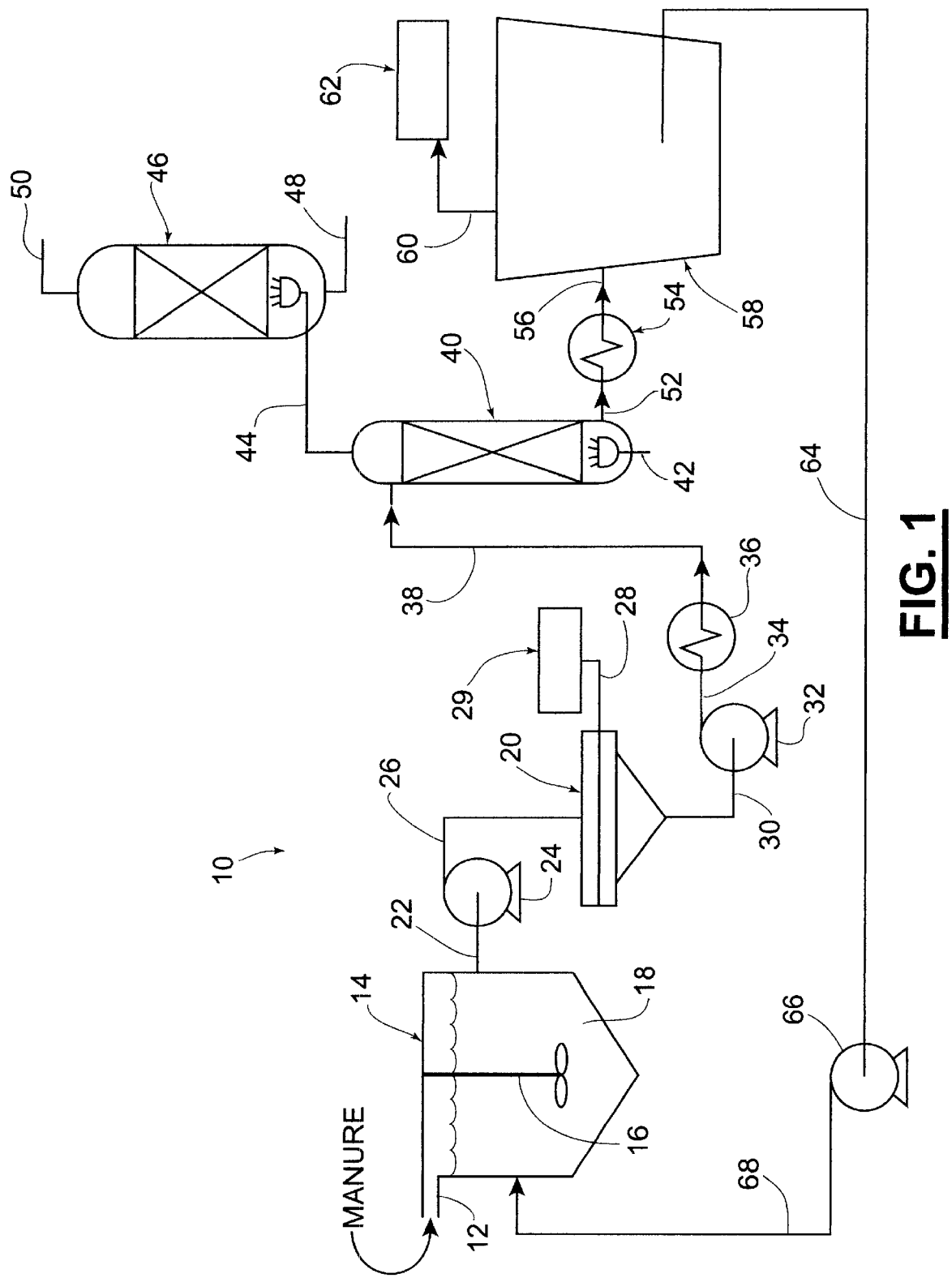
FIG. 1 is a schematic diagram of a process for treating animal manure using anaerobic digestion constructed in accordance with the present invention.

The present invention is directed to improved methods for treating manure which involve anaerobic digestion. Conventional anaerobic digestion technology has certain limitations in terms of reaction rates and the ability of the bacteria to be productive when conditions (such as pH, temperature and concentration of certain chemical constituents) in the digester are not optimum. The anaerobic digestion process depends on a collection of bacteria collectively known as anaerobes, and such bacteria systematically break down organic material into simple molecules. Pure organic material (material that strictly consists of hydrogen and carbon) is made into biogas, which consists primarily of methane and carbon dioxide. Heteroatoms such as nitrogen and sulfur that may be present in the organic material will be converted to ammonia and hydrogen sulfide, respectively.

The four basic stages of anaerobic digestion are as follows: (1) hydrolysis of large particulate solids; (2) fermentation of large molecules into intermediates, i.e., acids and alcohols; (3) conversion of such acids and alcohols into carbon dioxide, hydrogen and small chain fatty acids, e.g. acetates; and (4) reduction of carbon dioxide, hydrogen and acetates into methane. When viewing this conversion, the anaerobic bacteria broadly operate in two ways: (1) when converting the organic material into organic acids, such as acetic acid, these bacteria are known as acetogens; and (2) when converting the organic acids to methane, these bacteria are known as methanogens. The methanogenic bacteria, responsible for the final stage of anaerobic digestion, are only capable of doubling their population at a very slow rate of about 192 hours. On the other hand, the acetogenic bacteria involved in the intermediate stage of anaerobic digestion have a doubling rate about 60 times faster than that of the methanogenic bacteria. As the productivity and reaction rate of the digester are strictly dependent upon the productivity and reaction rates of the population of bacteria in the digester, the deficient growth rate of the methanogenic population of anaerobic bacteria must be overcome by not only maintaining the methanogenic population but also stabilizing the productivity and reactions rates of the metanogenic population in the digester. The economics of the process for treating manure using anaerobic digestion is dependent upon the productivity and reaction rates of the digester, and therefore high reaction rates mean that one can process more material in a shorter amount of time. Thus, the capital costs of any given operation can be reduced, since the size of the equipment can be reduced for any given task/conversion.

There are a number of parameters that can affect productivity of the bacteria and therefore the economics of the operation. Among these are the digester temperature; the stability of the digester temperature; intrusion of oxygen or air; fluctuations in pH; and build up of toxic chemical constituents such as ammonia, hydrogen sulfide or excess volatile fatty acids. Parameters which lower the productivity of the anaerobic bacteria are said to be "inhibitory".

It has been found that ammonia concentrations in excess of 1,500 ppm are inhibitory to anaerobic bacteria. As the concentration of ammonia in fresh caged layer manure is typically 1% ammonia on a 70% moisture basis, it has been difficult to use prior art anaerobic digestion processes on caged layer manure without diluting the manure with significant amounts of water (4 to 10 times the original mass of manure). While this eliminates the inhibitory effects of ammonia on the bacteria, the advantages of high reaction rates are eliminated due to the larger volume of material to be processed, and the economics of recovering valuable primary plant nutrients becomes economically infeasible. In addition, caged layer manure also contains about 1% organic nitrogen (on a 70% moisture basis). As the organic nitrogen is broken down to ammonia by the bacteria, it adds to the inhibitory effect on the population of bacteria.

As stated previously herein, the methanogens are relatively slow to reproduce. Therefore, any attempt to intervene in the buildup of inhibitory materials must give consideration to the potential deleterious effects of the methanogen population. The present invention includes improved processes which deliver the high reaction rates without diluting the feed material (i.e., caged layer manure containing ammonia and organic nitrogen) and without encumbering the bacteria with inhibitory conditions. By utilizing the process technology of the present invention, manure can be converted to commercial products and generate positive economics.

Briefly, the present invention includes adding raw manure, such as caged layer manure, to a mixing vessel containing a digester liquid which has largely been depleted of digestible organic materials but contains a similar mineral content as the raw manure, and the raw manure and digester liquid are agitated to produce a pumpable slurry. The pumpable slurry is withdrawn from the mixing vessel and filtered to remove the majority of water insoluble solids present in the pumpable slurry, thereby leaving a resultant liquid containing ammonia and reactive organic materials. The resultant liquid is then heated to a temperature in the range of from about 150° F. to about 230° F. for an effective period of time to break the bonds of certain compounds like ammonium phosphate as well as to cause the subsequent shift in the ionic state of ammonia from ammonium ($NH_4$) to ammonia ($NH_3$). In addition, bacteria present in the resultant liquid are destroyed during the heating of the pumpable slurry. The heated resultant liquid is then passed through a first separator to remove "free" ammonia, thereby producing a substantially ammonia-free liquid and preventing inhibition of the anaerobic digestion step of the process of the present invention by ammonia. The ammonia separated by passing the heated resultant liquid through the first separator can be recovered or passed to a second separator for formation of an ammonia salt which can be utilized as a commercial fertilizer product. The substantially ammonia-free liquid, which contains reactive organic materials, is withdrawn from the first separator, cooled to an appropriate digestion temperature and passed to a digester for conversion of the reactive organic materials to biogas. The biogas is withdrawn from the digester and passed to a collection system, and the collected biogas is desirably supplied to an electric operating plant for use in the generation of electricity. A portion of digester liquid remaining in the digester (which is substantially free of digestible organic materials) is removed from the digester and recycled to the mixing vessel for combining with manure in the first step of the process of the present invention. The amount of digester liquid that is recycled is sufficiently low so that the methanogen population in the digester is not depleted over time. The concentration of ammonia in the digester is thus maintained below the inhibitory level, and therefore the anaerobic bacteria population present in the digester is enhanced and is very productive. Therefore, the process of the present invention has the following advantages over the prior art: high reaction rates, small reactor volume, reacting liquids with a relatively high concentration of salts and water soluble solids, and low capital costs.

Shown in FIG. 1 is a schematic diagram illustrating one embodiment of a process 10 for treating manure using anaerobic digestion of the present invention. The process 10 for treating manure is illustrated as being continuous, and such process 10 is desirably conducted at a plant or facility which is in close proximity to the source of the manure. Manure, such as caged layer manure, is provided and passed through an inlet 12 into a mixing vessel 14 containing a digester liquid which is substantially free of digestible organic materials but contains a similar mineral content as the manure, which will be described in more detail hereinafter. The mixing vessel 14 is provided with an agitator or stirrer 16, which agitates the manure and digester liquid for an effective period of time to produce a pumpable slurry 18.

The volume of the mixing vessel 14 and conditions in the mixing vessel 14 may vary, as long as the mixing vessel 14 is capable of producing the pumpable slurry 18 as described herein. The contents of the mixing vessel 14 are maintained at ambient temperature and pressure, i.e., a temperature in the range of from about 80° F. to about 90° F. and a pressure of about 14.7 psi.

The ratio of manure to digester liquid in the mixing vessel 14 may vary, depending upon the mass and percent moisture basis of the manure. Desirably, the pumpable slurry 18 formed from the manure and digester liquid will have a filterable solid content of from about 5% to about 15%, and preferably, about 7%. To obtain such a filterable solid content in the pumpable slurry 18, the contents of the mixing vessel 14 will be about 75% to about 85% digester liquid and about 15% to about 25% raw manure. However, it is to be understood that this does not result in a significant dilution of manure in water (such as 4 to 10 times the original mass of the manure as required by the prior art), as the digester liquid contains a similar mineral content as the manure.

The amount of time required for the mixing vessel 14 to produce the pumpable slurry 18 may vary, depending upon the amount of digester liquid present in the mixing vessel 14, the amount of manure introduced into the mixing vessel 14 and the moisture content of such manure. Desirably, however, the amount of time required for agitation of the mixture to produce the pumpable slurry 18 will be in the range of from about 5 minutes to about 60 minutes.

The pumpable slurry 18 is withdrawn from the mixing vessel 14 and passed to a solid separator 20 via a conduit 22, a pump 24 and a conduit 26. Any pump capable of withdrawing the pumpable slurry 18 from the mixing vessel 14 and passing the pumpable slurry 18 to the solid separator 20 via the conduits 22 and 26 may be employed as the pump 24. Desirably, however, the pump 20 operates in a pressure range of from about 0 psi to about 60 psi.

The solid separator 20 filters the pumpable slurry 18 to remove substantially all water insoluble solids therefrom and provide a resultant liquid containing ammonia and reactive organic materials. The separated water insoluble solids, which may include cellulosic materials, bran, feathers, and undigested grain, are discharged from the solid separator 20 and passed via a conduit 28 to a collection vessel 29 for conversion into feed material as described in more detail herein below. Any type of solid separator capable of separating the water insoluble solids from the resultant liquid may be utilized as the solid separator 20. Desirably, the solid separator 20 is a "shale shaker" comprising a vibrating screen shaker, a belt press with two rubber coated rollers and a belt comprising a perforated material such as a 60 mesh stainless steel screen. When employing such a shale shaker as the solid separator 20, the pumpable slurry 18 is passed through the vibrating screen shaker with the resulting solids going to the belt press, which passes the wet solids between the two rubber coated rollers which squeeze the resultant liquid therefrom so that only the about 90% moisture to about 65% moisture solids remain thereon. Desirably, the vibrating screen shaker is provided with a mesh size in the range of from about 60 to about 80 mesh.

The resultant liquid containing ammonia and reactive organic materials is withdrawn from the solid separator 20 and passed via a conduit 30, a pump 32 and a conduit 34 through a heat exchanger 36 wherein the resultant liquid is heated to a temperature in the range of from about 150° F. to about 230° F. for an effective period of time to break chemical bonds of certain compounds like ammonium phosphate, to cause the subsequent shift in the ionic state of ammonia from ammonium ($NH_4$) to ammonia ($NH_3$), and to destroy active bacteria present in the resultant liquid. Preferably, the effective amount of time for maintaining the resultant liquid at such temperature in the heat exchanger 36 is less than about 5 minutes.

Any pump capable of withdrawing the resultant liquid from the solid separator 20 without causing damage to the solid separator 20 or undesired withdrawal of the water insoluble solids from the solid separator 20 can be employed as the pump 32. Desirably, however, the pump 32 operates in a pressure range of from about 0 psi to about 60 psi.

The heated resultant liquid is then passed, via a conduit 38, to a first separator 40 wherein ammonia present in the heated resultant liquid is removed, thereby producing a substantially ammonia-free liquid containing reactive organic materials. Preferably, the method of removing the ammonia from the heated resultant liquid in the first separator 40 includes passing a gas, such as steam, through a conduit 42 into the first separator 40 and withdrawn from the container 40 via a conduit 44. Thus, the flow of the heated resultant liquid is in a counter direction to the flow of the gas. The process of passing the gas through the heated resultant liquid results in the absorption of the ammonia present in the heated resultant liquid by the gas, thereby removing the ammonia from the heated resultant liquid and producing a substantially ammonia-free liquid containing reactive organic materials. As previously stated herein above, ammonia concentrations in excess of 1,500 ppm are inhibitory to anaerobic bacteria; therefore, removal of ammonia at this point in the process 10 prevents inhibition of downstream steps of the process 10 of the present invention by the presence of ammonia.

The first separator 40 is desirably a packed bed containing standard inert packing materials such as raschig rings or "saddles" (such materials being known to one of ordinary skill in the art). The first separator 40 is depicted as having the conduit 38 through which the heated resultant liquid passes connected to an upper end thereof, the conduit 42 through which the gas enters the first separator 40 connected to a lower end thereof, and the conduit 44 through which the gas containing the ammonia is removed connected to the upper end thereof. By passing the heated resultant liquid through the packed bed of the first separator 40, a maximum amount of liquid surface area is created for interactions between the gas and the heated resultant liquid, and the counter flow of the gas relative to the heated resultant liquid results in optimum removal of ammonia from the heated resultant liquid.

The ammonia-containing gas is withdrawn from the first separator 40 via conduit 44 and passed to a second separator 46 containing a dilute acid, such as sulfuric acid, phosphoric acid, citric acid or nitric acid, wherein the ammonia is removed from the ammonia-containing gas and an ammonia salt is produced, which may be utilized in the formation of a commercial fertilizer product. The reaction of the dilute acid with ammonia in the second separator 46 results in production of an ammonia salt which may be utilized as a commercial fertilizer product. Such ammonia salt is discharged from the second separator 46 via a conduit 48.

In another alternative of the present invention, the ammonia may be captured from the ammonia-containing gas withdrawn from the first separator 40 and recovered as an ammonia/water blend or as anhydrous ammonia. Such ammonia-containing products could be used to product a wide variety of products, including a commercial fertilizer product.

The substantially ammonia-free gas remaining in the second separator 46 is withdrawn via a conduit 50 and vented to the atmosphere. Optionally, when steam is utilized as the gas, the steam could be condensed to distilled water and utilized in the facility at which the process 10 of the present invention is conducted. In addition, waste heat may be captured in the form of low pressure steam to aid in supplying process energy requirements.

The substantially ammonia-free liquid containing the reactive organic materials is then withdrawn from the first separator 40 via a conduit 52 and passed through a second heat exchanger 54, wherein the substantially ammonia-free liquid containing the reactive organic materials is cooled to provide a cooled liquid stream. Preferably, passage through the second heat exchanger 54 provides a cooled liquid stream having a temperature in the range of from about 100° F. to about 140° F., which temperature substantially corresponds to the temperature at which digestion occurs.

The cooled liquid stream is then passed from the heat exchanger 54 via a conduit 56 to a digester 58. In FIG. 1, the passage of liquid from the first heat exchanger 36 to the first separator 40 to the second heat exchanger 54 to the digester 58 is illustrated as simply being by gravity flow through. However, if desired, a pump may be utilized for delivery of the liquid from the first heat exchanger 36 to the first separator 40 and/or to the second heat exchanger 54 and/or to the digester 58.

The digester 58 contains anaerobic bacteria which convert the reactive organic materials present in the cooled liquid stream to biogas. The biogas generated has a high methane content (greater than about 70%) and a low hydrogen sulfide content (less than about 0.4%). The digester 58 is maintained at an appropriate temperature conducive to conversion of the reactive organic materials to biogas by the anaerobic bacteria. The temperature of the digester 58 may be maintained in the range of from about 32° F. to about 80° F. for a psychrophillic reaction (wherein a preferred range is from about 70° F. to about 80° F.), in the range of from about 100° F. to about 108° F. for a mesophillic reaction, or in the range of from about 129° F. to about 137° F. for a thermophillic reaction. Desirably, the temperature of the digester 58 is in the range of from about 100° F. to about 140° F., and more desirably between about 100° F. to about 110° F. The digester is maintained at ambient pressure (i.e., about 14.7 psi).

The biogas so produced is withdrawn from the digester 58 and passed via a conduit 60 to a collection system 62 for use in generating electricity. The collection system 62 may be an electric generator for directly generating electricity in conjunction with the process 10 of the present invention. Optionally, the collection system 62 may be a storage vessel for holding the biogas until needed for use or until sold or transported to an electric plant. Alternatively, the collection system 62 may be a treatment tower for refining the biogas prior to passage to a storage vessel or an electric generator or transported to an electric plant for use in generating electricity or distribution of the biogas to purchasers. The electricity so produced may be used to power requirements at the egg laying operation and/or the facility at which the continuous process 10 of the present invention is conducted, with excess power being sold to an electric cooperative operation.

In a preferred embodiment of the present invention, the biogas from the digester 58 will be delivered to a collection system 62 via the conduit 60, wherein the collection system 62 comprises a low pressure compressor and a moderate volume storage tank. From such a low pressure system, the biogas will flow through a treatment tower for refining, which will include removing the hydrogen sulfide from the biogas as well as passing the biogas through a liquid knockout. The biogas will then flow to a compressor that will raise the gas pressure to about 200 psi. This moderate pressure gas will then be passed to a volume tank having about 2,000 cubic feet volume. Such moderate pressure gas can now be utilized as fuel, which is distributed from the volume tank to fuel consuming process equipment, which may include a spark-ignited reciprocating engine, a fuel cell, a gas turbine, a boiler and a rotary dryer. Steam generated from the boiler may also be utilized to serve process energy needs as well as to produce fertilizer, as described herein above with reference to the ammonia removed by the process 10 of the present invention. Waste heat recovered from the exhaust gases from the spark-ignited, reciprocating engine or the gas turbine may be recovered to produce steam for use in the process 10 of the present invention, to supplement the process energy requirements.

A digester liquid remains in the digester 58 following conversion of the reactive organic materials present in the cooled liquid stream to biogas, and such digester liquid is therefore substantially free of digestible organic materials. An effective amount of the digester liquid is withdrawn from the digester 58 via a conduit 64, a pump 66 and a conduit 68 and recycled back to the mixing vessel 14 for combining with manure to repeat the process 10 of the present invention.

The term "an effective amount of the digester liquid" as used herein is defined as an amount of digester liquid which is large enough for admixing with manure to produce the pumpable slurry 18 but sufficiently low enough to prevent the methanogen population present in the digester 58 from being depleted over time. It is to be understood that the effective amount of digester liquid may be any volume of digester liquid which allows the process 10 to function in accordance with the present invention. Generally, such an effective amount of digester liquid will be about 2% to about 8% of the total amount of digester liquid present in the digester 58, and preferably about 5% of the total amount of digester liquid present in the digester 58.

Any pump capable of withdrawing an effective amount of digester liquid from the digester 58 but preventing excess digester liquid from flowing out of the digester 58 and depleting the methanogen population present in the digester 58 can be employed as the pump 66. Desirably, however, the pump 66 operates in a pressure range of from about 0 psi to about 60 psi.

As mentioned above, several useful products are generated using the continuous process 10 for treating manure, especially caged layer manure, using anaerobic digestion of the present invention, wherein such useful products may be utilized to provide a profit. First, the process 10 of the present invention generates the biogas having a high methane content (greater than about 70%) and a low hydrogen sulfide content (less than about 0.4%). Such biogas is used to produce electricity as described herein before, and excess power produced in such a manner can be sold to a third party such as an electric cooperative operation and can be used to support the power consumption requirements of the egg laying operation. When the use of the biogas to generate electricity becomes more efficient, the provider of the process 10 of the present invention may become the power provider for the egg laying operation. While analysis of competition in product pricing will vary from site to site, it is estimated that electricity produced by the process 10 of the present invention can be priced in the range of from about 60% to about 70% of the market value and still enable the facility using the process 10 of the present invention to pay operating expenses, service debt and show a modest profit.

Another product generated from the process 10 of the present invention which may be utilized to produce a commercially viable product is the ammonia salt collected from the second separator 46. The ammonia salt will be used to produce a concentrated liquid fertilizer which can be marketed to individuals and organizations that have established relationships with local or area farmers. Such concentrated liquid fertilizer will contain the ammonia salt as collected from the second separator 46, and additives such as minerals may be added to such concentrated liquid fertilizer, depending upon local market demand and soil conditions. For example, the concentrated liquid fertilizer containing the ammonia salt may be supplemented with phosphorous, potassium, sulfur, calcium and/or iron, depending upon local market demand. While analysis of competition in product pricing will vary from site to site, it is estimated that concentrated liquid fertilizer produced in conjunction with the process 10 of the present invention can be priced at about 85% of the market value.

The value of a fertilizer is dependent not only on the contents of the fertilizer but also upon the physical form of the fertilizer (i.e., gas, liquid or solid) and the cost of applying the fertilizer. While anhydrous ammonia (a gas), is the lowest cost form of ammonia, its application requires proper soil moisture levels and is hazardous to personnel handling and applying the material. The second lowest cost nitrogen fertilizer source is urea; however, there is potential for nitrogen loss through ammonia volatilization. The next least expensive form of nitrogen fertilizer is a nitrogen solution (such as 28%, 30% and 32% nitrogen solutions), which offers ease of product transfer (via pumps), and can be mixed and applied with pesticides. Liquid fertilizers also offer the advantage of precision application in conjunction with real time metering/global positioning and nozzle selection, and the use of spray rigs with large booms can apply liquid fertilizers to an entire section in a single day, while the application rates of gaseous and dry fertilizer are much lower. Therefore, liquid fertilizer appears to be the most competitive form of nitrogen fertilizer available, and therefore concentrated liquid nitrogen fertilizer may be produced in conjunction with the process 10 of the present invention. In addition, the concentrated liquid nitrogen fertilizer can be mixed and applied with phosphorous, potassium and/or pesticides. Further, the concentrated liquid nitrogen fertilizer produced in conjunction with the process 10 of the present invention will meet commercial specifications required by state and federal laws for marketing as fertilizers.

A third product which can be generated by the process 10 of the present invention is the substantially water insoluble solids separated from the liquid via the solid separator 24 and removed from the solid separator 20 to the collection vessel 29. The solids thus recovered from the solid separator 20 can be used as a feed material to produce feed for ruminant animals. The protein content of the feed material can be varied or tailored to meet specific nutritional requirements, for example but not by way of limitation, a cattle cube containing 15%, 20%, 25% or even 30% protein content can be produced.

In addition, other materials may be combined with the substantially water insoluble solids during formation of the feed for ruminant animals, such as cattle cubes. Such materials include bran, alfalfa, soybeans, cotton seeds, molasses, wheat mids, corn gluten feed, yellow grease, rice hulls, peanut hulls, etc., as well as animal by-products such as feather meal. Feed material formed therefrom is sufficiently high in protein and minerals to supply the nutritional requirements of cattle both during the early growth phase of calves and for maintenance of mature cows during the winter. In addition, vitamins (such as vitamins A and D), minerals (such as salt and calcium supplements) and even antibiotics may be blended therein to provide a feed that is specifically designed to meet the nutritional needs of cattle.

The facility at which the process 10 of the present invention is conducted may install blending, grinding and pelleting equipment at the site to produce a feed product on site from the bulk substantially water insoluble solids recovered from the solid separator 20 of the process 10 of the present invention, or the bulk substantially water insoluble solids recovered from the solid separator 20 of the process 10 of the present invention may be sold to an area feed mill for feed formulation, packaging, distribution and sales. Optionally, the bulk substantially water insoluble solids may be used in a gasifier or combusted directly to provide energy in the form of steam or electricity. Also, use of the bulk substantially water insoluble solids as a feed stock for production of chemicals such as alcohols or diols may also be considered within the scope of the present invention.

While the process of the present invention has been described in detail herein for the bioconversion of manure and especially caged layer manure, it is to be understood that such processes are readily adaptable to other types of manure as well as other waste products, including dairy manure, beef cattle manure and concentrated swine waste. In addition, the process of the present invention is not limited to the use of caged layer manure but also includes all types of poultry manure, including broiler manure and broiler litter. It is within the ability of one of ordinary skill in the art to adapt such processes without undue experimentation, and therefore the present invention is not limited simply to the process described herein but also includes such adaptable processes which are within the abilities of one of ordinary skill in the art.

In addition, while the process 10 has been described herein and illustrated in FIG. 1 as a continuous process, it is to be understood that another embodiment of the process of the present invention may be a batch process, in which excess digester liquid is passed through an outlet for disposal, while a liquid, such as water or a liquid containing a similar mineral content to that of manure (i.e., a liquid containing potassium and phosphorous), is combined with the manure in the first step of the process. Such a batch process would have the advantage of allowing for isolation of any methanogenic bacteria from the digester liquid removed from the digester prior to disposal so that such methanogenic bacteria can be recycled back to the digester, thereby preventing any depletion of the methanogen population from the digester by removal of the digester liquid. In addition, the digester liquid removed from the digester may be stored until such a time that it is desired to mix the digester liquid with the manure to repeat the process of the present invention.

When the manure utilized in the process 10 of the present invention is caged layer manure, the process 10 of the present invention improves the profitability of the egg producer by eliminating the cost of manure disposal and returning certain commodities to the laying facility. The environmental liability of the egg producer is also reduced since there is no application of raw manure to the ground, thereby preventing rainwater runoff of pollutants into surface and ground waters and significantly reducing emission of greenhouse gases to the atmosphere. The net environmental impact of the process 10 of the present invention on the egg laying operation is very positive, and as a result, the overall operation of the conversion plant utilizing the process 10 of the present invention will be fully compliant with current and anticipated environmental laws and regulations.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A process for treating manure using anaerobic digestion, comprising the steps of:

provide manure having a mineral content;

introducing the manure into a mixing vessel containing a digester liquid which is substantially free of digestible organic materials and contains a mineral content;

agitating the manure and digester liquid in the mixing vessel for an effective amount of time to produce a pumpable slurry;

withdrawing the pumpable slurry from the mixing vessel;

filtering the pumpable slurry to remove substantially all water insoluble solids therefrom and provide a resultant liquid containing ammonia and reactive organic materials;

heating the resultant liquid to a temperature in the range of from about 150° F. to about 230° F. for an effective amount of time to break chemical bonds and destroy active bacteria present in the resultant liquid;

removing ammonia from the heated resultant liquid to produce a substantially ammonia-free liquid containing reactive organic materials;

cooling the substantially ammonia-free liquid containing reactive organic materials to a temperature in the range of from about 70° F. to about 140° F. to provide a cooled liquid stream containing reactive organic materials; and passing the cooled liquid stream to a digester containing anaerobic bacteria to convert the reactive organic materials in the cooled liquid stream to biogas, thereby producing a digester liquid substantially free of digestible organic materials;

withdrawing the biogas from the digester; and withdrawing an effective amount of the digester liquid from the digester and recycling the withdrawn digester liquid to the mixing vessel for mixing with manure.

2. The process of claim 1 wherein, in the step of passing the cooled liquid stream to the digester, the ammonia concentration in the digester is maintained at a level below about 1500 ppm to prevent inhibition of the anaerobic bacteria.

3. The process of claim 1 wherein the step of removing ammonia from the heated resultant liquid is further defined as passing the heated resultant liquid through a separator through which steam is passed such that the ammonia present in the heated resultant liquid is absorbed by the steam.

4. The process of claim 3 wherein the method further comprises passing the steam containing the ammonia to a second separator containing a dilute acid, wherein the ammonia is reacted with the dilute acid to produce an ammonia salt which may be utilized as a fertilizer.

5. The process of claim 1 wherein, in the step of passing the cooled liquid stream to the digester, the biogas comprises methane and carbon dioxide.

6. The process of claim 1 wherein, in the step of filtering the pumpable slurry to remove substantially all water insoluble solids therefrom, the water insoluble solids are collected and converted to at least one of ruminant animal feed, a feed stock for production of chemicals, and a fuel source to satisfy energy and process heat requirements.

7. The process of claim 1 wherein, in the step of providing a manure, the manure is poultry manure.

8. The process of claim 7 wherein the poultry manure is caged layer manure.

9. The process of claim 1 wherein such process is conducted at a facility in proximity to a facility at which the manure is produced.

10. The process of claim 1 wherein the process is continuous.

11. The process of claim 1 wherein the step of withdrawing the biogas from the digester further includes utilizing the biogas for generating electricity.

12. The process of claim 1 wherein the step of withdrawing the biogas from the digester further includes collecting the biogas.

13. A process for treating poultry manure using anaerobic digestion, comprising the steps of:

providing poultry manure having a mineral content;

introducing the manure into a mixing vessel containing a digester liquid which is substantially free of digestible organic materials and contains a mineral content;

agitating the manure and digester liquid in the mixing vessel for an effective amount of time to produce a pumpable slurry;

withdrawing the pumpable slurry from the mixing vessel;

filtering the pumpable slurry to remove substantially all water insoluble solids therefrom and provide a resultant liquid containing ammonia and reactive organic materials;

heating the resultant liquid to a temperature in the range of from about 150° F. to about 230° F. for an effective amount of time to break chemical bonds and destroy active bacteria present in the resultant liquid;

removing ammonia from the heated resultant liquid to produce a substantially ammonia-free liquid containing reactive organic materials;

recovering the ammonia removed from the heated resultant liquid such that the ammonia may be utilized as a fertilizer;

cooling the substantially ammonia-free liquid containing reactive organic materials to a temperature in the range of from about 70° F. to about 140° F. to provide a cooled liquid stream containing reactive organic materials; and passing the cooled liquid stream to a digester containing anaerobic bacteria to convert the reactive organic materials in the cooled liquid stream to biogas, thereby producing a digester liquid substantially free of digestible organic materials, wherein the ammonia concentration in the digester is maintained at a level below about 1500 ppm to prevent inhibition of the anaerobic bacteria;

withdrawing the biogas from the digester and collecting the biogas for utilizing to generate electricity; and withdrawing an effective amount of the digester liquid from the digester and recycling the withdrawn digester liquid to the mixing vessel for mixing with manure.

14. The process of claim 13 wherein the poultry manure is caged layer manure.

15. The process of claim 13 wherein such process is conducted at a facility in proximity to a facility at which the manure is produced.

16. The process of claim 13 wherein the process is continuous.

17. A process for treating poultry manure using anaerobic digestion, comprising the steps of:

providing poultry manure having a mineral content;

introducing the manure into a mixing vessel containing a digester liquid which is substantially free of digestible organic materials and contains a mineral content;

agitating the manure and digester liquid in the mixing vessel for an effective amount of time to produce a pumpable slurry;

withdrawing the pumpable slurry from the mixing vessel;

filtering the pumpable slurry to remove substantially all water insoluble solids therefrom and provide a resultant liquid containing ammonia and reactive organic materials;

recovering the substantially water insoluble solids;

heating the resultant liquid to a temperature in the range of from about 150° F. to about 230° F. for an effective amount of time to break chemical bonds and destroy active bacteria present in the resultant liquid;

removing ammonia from the heated resultant liquid to produce a substantially ammonia-free liquid containing reactive organic materials;

recovering the ammonia removed from the heated resultant liquid in the form of an ammonia salt, an ammonia/water blend or anhydrous ammonia wherein the ammonia salt, ammonia/water blend or anhydrous ammonia may be utilized as a fertilizer;

cooling the substantially ammonia-free liquid containing reactive organic materials to a temperature in the range of from about 70° F. to about 140° F. to provide a cooled liquid stream containing reactive organic materials; and passing the cooled liquid stream to a digester containing anaerobic bacteria to convert the reactive organic materials in the cooled liquid stream to biogas, thereby producing a digester liquid substantially free of digestible organic materials, wherein the ammonia concentration in the digester is maintained at a level below about 1500 ppm to prevent inhibition of the anaerobic bacteria;

withdrawing the biogas from the digester and collecting the biogas for utilizing to generate electricity; and withdrawing an effective amount of the digester liquid from the digester and recycling the withdrawn digester liquid to the mixing vessel for mixing with manure.

18. The process of claim 17 wherein the poultry manure is caged layer manure.

19. The process of claim 17 wherein such process is conducted at a facility in proximity to a facility at which the manure is produced.

20. The process of claim 17 wherein the process is continuous.

* * * * *